C. H. PYM & E. J. WITCOMBE.
GAGE FOR WHEELS OF MOTOR CARS AND THE LIKE.
APPLICATION FILED OCT. 6, 1917.
1,298,090.
Patented Mar. 25, 1919.
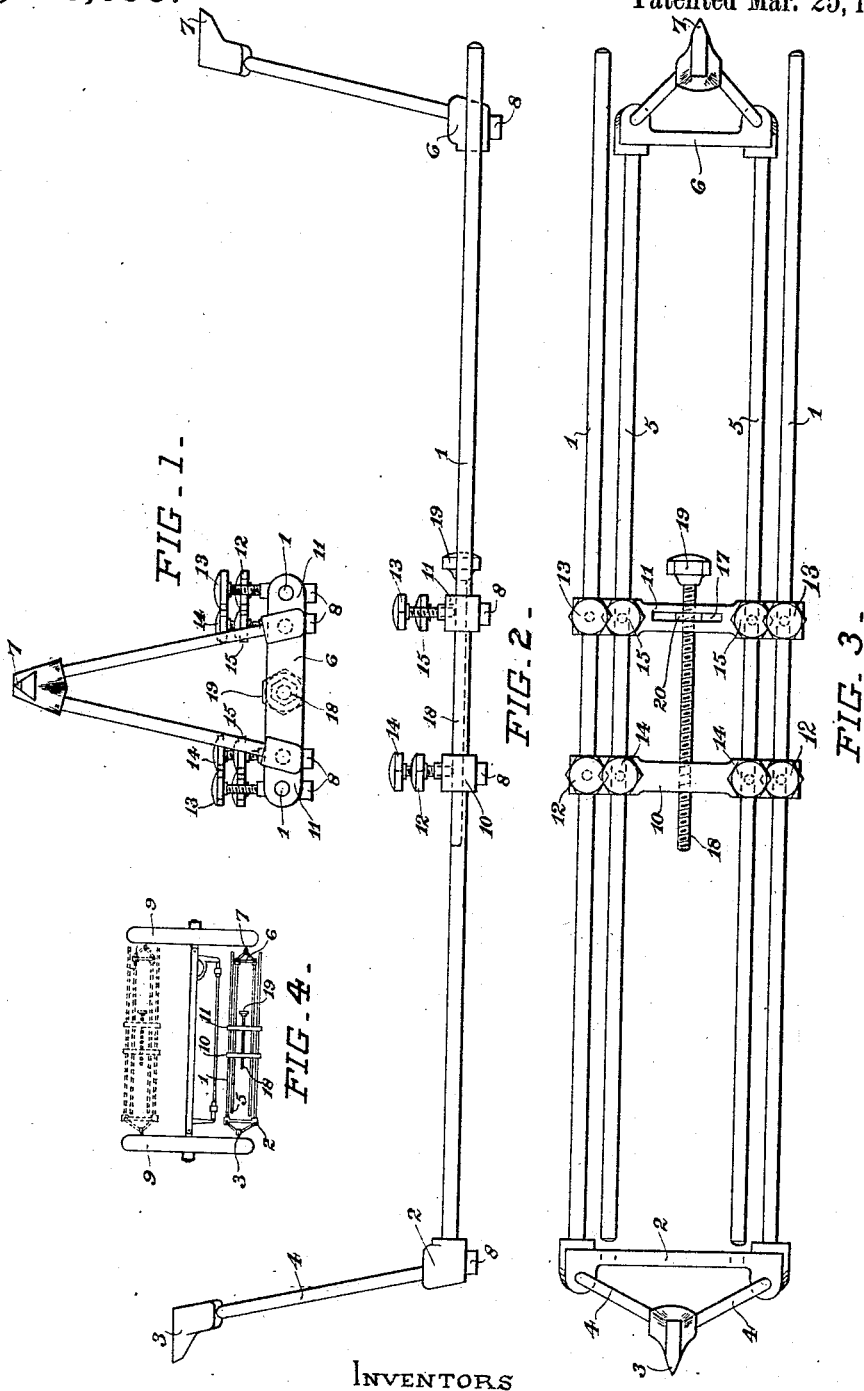
INVENTORS
CHARLES H. PYM AND EDWARD J. WITCOMBE
Featherstonhaugh & Co.
ATTYS

UNITED STATES PATENT OFFICE.

CHARLES HENRY PYM AND EDWARD JAMES WITCOMBE, OF WELLINGTON, NEW ZEALAND.

GAGE FOR WHEELS OF MOTOR-CARS AND THE LIKE.

1,298,090. Specification of Letters Patent. Patented Mar. 25, 1919.

Application filed October 6, 1917. Serial No. 195,127.

*To all whom it may concern:*

Be it known that we, CHARLES HENRY PYM and EDWARD JAMES WITCOMBE, trading as WITCOMBE & PYM, citizens of the Dominion of New Zealand, and residing at Vivian street, Wellington, in the Provincial District of Wellington, in the Dominion of New Zealand, have invented certain new and useful Improvements in Gages for Wheels of Motor-Cars and the like, of which the following is a specification.

This invention relates to means employed for gaging the wheels of motor cars and the like, so that they shall " track " properly on a road.

For correct running of wheels of a motor car and the like it is essential, particularly in the case of the front wheels, that a horizontal line across the face of one wheel shall be parallel or approximately parallel to a horizontal line across the face of an opposing wheel on the other side of the car or the like.

The invention consists of a gage whereby the wheels can be tested to ascertain whether they are set accurately in relation to each other.

The invention may be conveniently and advantageously carried into effect as shown in the accompanying drawings, wherein:—

Figure 1, is an end elevation,

Fig. 2, is a side elevation, and

Fig. 3, is a plan of the gage, and

Fig. 4, is a plan of a pair of wheels with the gage in position.

The rods 1 are parallel to each other and fixed at one end to a headstock 2, from which a pointer 3 is raised upon a bracket or rods 4.

Other rods 5 parallel to the rods 1 are fixed at one end to an opposing headstock 6, from which a pointer 7 is raised to a height corresponding to that of the pointer 3.

The height of the pointers 3 and 7 from the feet 8 of the headstock corresponds to the height of the center of the wheels 9 from the ground.

The rods 1 and 5 pass through crossbars 10 and 11, which are respectively adapted to be clamped to the rods 1 by set screws 12 and 13, and respectively to the rods 5 by set screws 14 and 15. The crossbar 11 has a slot 17, and a screw 18 with a head 19 passes freely through the crossbar 11, and is threaded through the crossbar 10. A nut 20 in the slot 17 is tightly screwed upon the screw 18 and is turnable in the said slot.

Rough lengthwise adjustment of the gage to the space between the rims of the wheels 9 is made by releasing the set screws 13 and 14 and sliding the rods 5 in the crossbar 10 and sliding the crossbar 11 on the rods 1, or by releasing the set screws 12 and 15 and sliding the rods 1 in the crossbar 11. Accurate lengthwise adjustment is afterward made by means of the screw 18.

The gage is used with its feet 8 on the floor, which must be level or approximately so, all the screws 12, 13, 14 and 15 are released, or at least the screws 14 and 15 or the screws 12 and 13 are released and the gage is then set with the pointers 3 and 7 spaced apart to correspond approximately to the distance between the rims of the pair of wheels 9 and at the forward side thereof, as shown by full lines in Fig. 4. The screws 13 and 14 or the screws 12 and 15 are then tightened up, and a final accurate adjustment of the gage to the distance between the rims is made by operating the screw 18, after which the screws 12 and 15 or 13 and 14, whichever may have been released, are also tightened up, that is to say, all the screws 12, 13, 14 and 15 are tightened up. The gage is then moved to the rearward side of the rims of the wheels 9, as shown by dotted lines in Fig. 4. The wheels are set until the distance between the rims at the front side of wheels 9 is about one sixteenth of an inch shorter than the distance between the rims at the rear side of the wheels.

The rods 1 and 5 may be made of solid bars or of tubing, and the headstocks 2 and 6 and the pointers 3 and 7 may be made of cast iron, forgings or pressed work.

What we do claim and desire to secure by Letters Patent of the United States is:—

1. The herein described gage comprising two pairs of parallel rods slidably held in relation to each other and pointers carried by each pair, substantially as set forth.

2. The herein described gage comprising two pairs of parallel rods adjustably held in relation to each other and oppositely directed offset pointers, each pair of rods carrying one of said pointers, substantially as set forth.

3. A gage comprising an inner and an outer pair of parallel rods, a headstock fixed to each pair at opposite ends, means for adjusting the rods of one headstock relatively to the rods of the other and pointers extending from the headstocks, substantially as set forth.

4. The herein described gage, comprising parallel rods fixed to opposing headstocks having raised pointers, crossbars through which the rods pass and screws for clamping the crossbars to the rods, substantially as set forth.

5. The herein described gage, comprising parallel rods fixed to opposing headstocks having raised pointers, crossbars through which the rods pass, one of said cross bars being provided with a slot, a screw passing freely through said crossbar and screw threaded through the other crossbar, and a nut secured to the screw and turnable in said slot, and screws for clamping the crossbars to the rods, substantially as set forth.

6. The herein described gage, comprising parallel rods fixed to opposing headstocks having raised pointers, crossbars through which the rods pass, and screws for clamping either crossbar to the rods of either headstock, substantially as set forth.

In testimony whereof we have signed our names to this specification in the presence of two witnesses.

CHARLES HENRY PYM.
EDWARD JAMES WITCOMBE.

Witnesses:
ERNEST SMITH BALDWIN,
FREDERICK CECIL AMBRIDGE.

Copies of this patent may be obtained for five cents each, by addressing the "Commissioner of Patents, Washington, D. C."